3,451,859
NOBLE METAL THERMOCOUPLE HAVING BASE
METAL COMPENSATING LEADS
Edward D. Zysk, Livingston, Eugene E. Osovitz, English-
town, and Robert W. Stephans, Paterson, N.J., assignors
to Engelhard Industries, Inc., Newark, N.J., a corpora-
tion of Delaware
Filed Aug. 31, 1967, Ser. No. 664,793
Int. Cl. H01v 1/10
U.S. Cl. 136—227        6 Claims

ABSTRACT OF THE DISCLOSURE

The present invention deals with a noble metal thermo-couple comprising platinum-rhodium vs. platinum-rhodium as thermocouple legs, with each leg having connected thereto a base metal compensating lead closely approximating the E.M.F. output of its respective thermocouple leg, measured against a common standard thermocouple element, over the range of about 0° C. to about 1000° C. Thus, when the compensating leads are each connected to their respective thermocouple legs, the E.M.F. output of the couple formed by the base metal leads, over the range of from about 0° C. to about 1000° C. at the connection points between the leads and the thermocouple legs, will closely approximate the E.M.F. output of the noble metal thermocouple in this temperature range. The thermocouple is capable of measuring temperatures to about 1750° C.

Background of the invention

Figure 1:
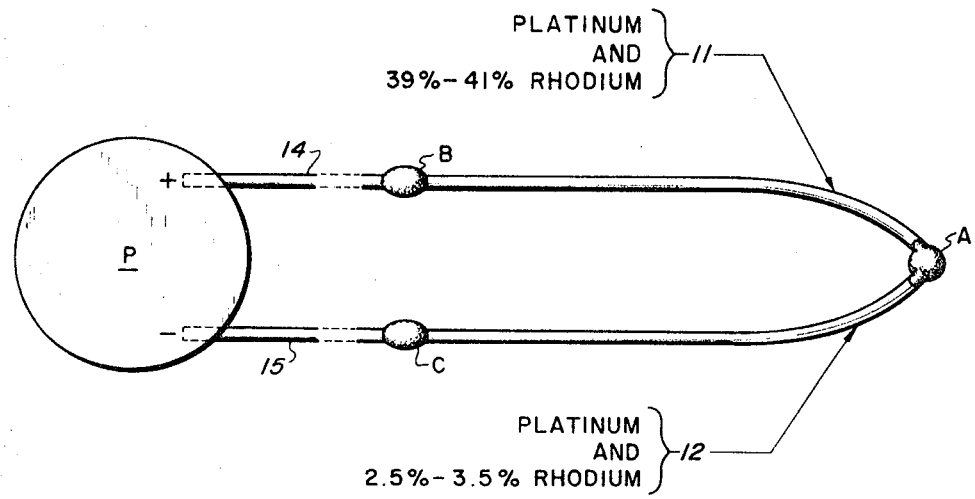

In the type of thermocouple with which the present invention is concerned, a pair of dissimilar noble metal thermocouple leg wires are joined at one end to form a thermoelectric couple at the junction which is normally referred to as the "hot junction." The legs are normally kept separate by ceramic insulators and the thermoelectric response to temperature changes at the hot junction are measured by a potentiometer connected across the free ends of the legs. Depending on the type of application and environment protective sheaths (metallic or ceramic) may or may not be used.

The precious metal or noble metal legs are expensive and it is desirable to have the legs short and to be able to use less expensive base metal lead wires (extension wires) between the free ends of the thermocouple legs and the potentiometer. It is a problem, however, to find base metal lead wires which match the leg wires so as not to distort the potentiometer thermoelectric response of the leg wires over the range of temperatures intended to be measured by the thermocouple.

When lead wires are used the connections between the lead wires and their respective leg wires are herein referred to as the "connection points." For a suitable match the pattern of thermoelectric responses of a couple formed by the lead wires must approximately match, within allowable limits, the pattern of thermoelectric responses of the leg wires over a range of temperatures expected at the connection points when the hot junction is at a temperature within the range intended to be measured by the thermocouple. The temperature at the connection points is determined by the ambient temperature and conduction of heat from the hot junction.

However, in order to provide an accurate measurement of temperature, it has been recognized that the remote ends of the lead wires, or of the thermocouple legs if no lead wire is used must be maintained at a known constant low temperature, e.g., 0° C. This junction between the lead wires and potentiometer is herein referred to as the "reference junction." (Copper leads are used from this point to the measuring potentiometer.)

In the laboratory, when accurate measurements are desired, the reference junction is maintained at 0° C. by a thermos containing a carefully prepared and maintained ice slush. In other installations, such as aircraft, missiles or chemical processes, the maintenance of an ice reference junction is not practical and other means, e.g., electronic means, are used to maintain conditions equivalent to a constant low temperature at the reference junction. In the latter case the closeness with which the reference temperature is maintained may vary from device to device used. The accuracy of the temperature measured by the hot end of the thermocouple will depend on how close the reference temperature is maintained. In certain installations, such as aircraft, where space is an important factor, the necessity of providing means, e.g., electronic means, for maintaining conditions equivalent to a constant low temperature at the reference junction is a considerable disadvantage.

Summary of the invention

In accordance with the invention, it has been found that a platinum-rhodium vs. platinum-rhodium thermocouple, e.g., a Pt-3% Rh (negative leg) vs. Pt-40% Rh (positive leg) thermocouple, can be provided with certain base metal compensating or extension leads which not only closely match the E.M.F. output of the thermocouple within the range of 0°–1000° C., but also the E.M.F. vs. temperature curve of these lead wires has a shallow slope in the temperature range of 0–100° C. This constant low E.M.F. eliminates the need in many industrial applications for the close maintenance of the reference junction temperature when the remote end of the lead wire is used in this temperature range (0–100° C.). For example, one compensating lead (positive leg) may be composed of Ni-4.5% W and the other may be composed of 34% Ni-20% Cr-0.15% C-balance Fe. The metal compositions herein recited are given in weight percent.

The noble metal thermocouple described in this invention is capable of measuring temperatures to about 1750° C. Of great importance is the fact that both the noble metal thermocouple wires and the base metal lead wires can be used in air or an oxidizing atmosphere at high temperatures without suffering a serious change in E.M.F. response patterns; the noble metal wires in the operating range to 1750° C. and the lead wires to 850° C. In an inert atmosphere the base metal wires may be used to a temperature of about 1000° C. Thus in the measuring of very high temperatures in many industrial applications a great economy can be effected with use of a thermocouple-lead wire system comprising short pieces of the expensive noble metal thermocouple wires and relatively long lengths of much less expensive base metal lead wires.

The drawing

Figure 2:
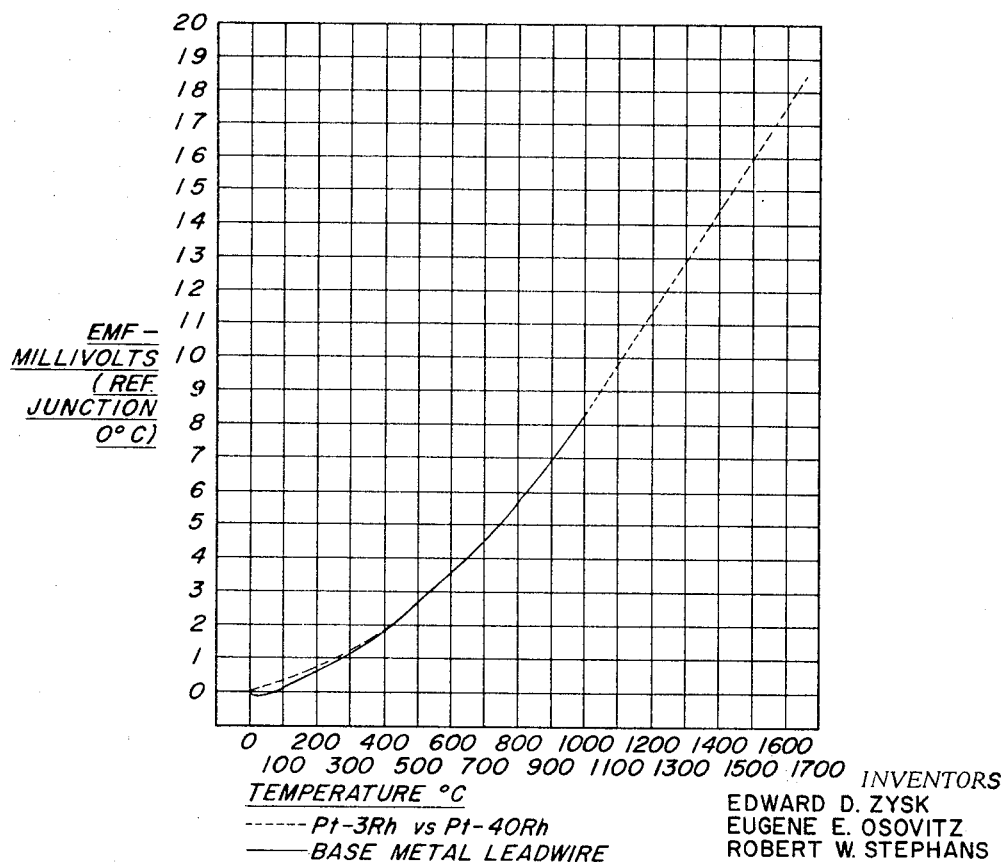

FIGURE 1 illustrates a partly elevational and partly schematic view of a thermocouple combination according to the invention and including its temperature measuring potentiometer, and FIGURE 2 illustrates graphically the matching E.M.F. vs. temperature characteristics of the noble metal and base metal lead wires of this invention.

Description of the preferred embodiments

The thermocouple-lead wire combination of the invention, as illustrated by FIGURE 1, comprises a positive thermocouple leg 11 composed of Pt-39% to 41% Rh, a negative thermocouple leg 12 composed of Pt-2.5% to 3.5% Rh or Pt-2.5% to 3.5% Rh and from 0% to about 2% of a metal selected from the group consisting of Zr, Ti, Au, Ce, Th and oxides thereof, a lead wire 14 for the positive leg composed of 33.5% to 34.5%

Ni-19.5% to 20.5% Cr-up to 0.15% C-balance Fe, and a lead wire 15 for the negative leg composed of Ni-4.25% to 4.75% W.

As shown in FIGURE 1, the thermocouple in accordance with the invention has a hot junction A, at which the positive leg 11 is joined to the negative leg 12 by welding or other appropriate means. The thermocouple response of the leg wires 11 and 12 to variation in temperature at the hot junction A is measured by a potentiometer P. The lead wires 14 and 15 are connected to lead wires 11 and 12 at connection points B and C, respectively. Since the lead wires are of different metal compositions, they also form couples which have E.M.F. outputs determined by the temperature at the connection points B and C. In order for the lead wires to match the leg wires in E.M.F. output, the E.M.F. output of the lead and leg wire couples at the connection points B and C should be closely equal over the temperature range expected at these junctions or connection points, i.e., at temperatures between 0–1000° C.

In accordance with the invention, a comparison of lead wires to their respective thermocouple legs was made by separately determining their E.M.F. vs. temperature response against a common standard thermocouple grade platinum wire established by the National Bureau of Standards and designated as platinum 27 (Pt 27). The close matching of the lead wires in comparison with their respective thermocouple legs is shown in the following Table I:

TABLE I.—E.M.F. IN MILLIVOLTS
(Reference Junction at 0° C.)

| Temp. °C. | Positive Lead- 34% Ni, 20% Cr, 0-15% C, balance Fe vs. Pt-27 | Positive Leg Pt-40% Rh vs. Pt-27 | Difference | Negative Lead Ni-4.54% W vs. Pt-27 | Negative Leg Pt-3% Rh vs. Pt-27 | Difference |
|---|---|---|---|---|---|---|
| 0 | 0 | 0 | 0 | 0 | 0 | 0 |
| 100 | .524 | .662 | +.138 | .491 | .423 | −.068 |
| 200 | 1.293 | 1.536 | +.243 | .764 | .894 | +.130 |
| 300 | 2.271 | 2.562 | +.291 | 1.038 | 1.375 | +.337 |
| 400 | 3.418 | 3.727 | +.309 | 1.574 | 1.862 | +.288 |
| 500 | 4.728 | 4.998 | +.270 | 2.133 | 2.342 | +.209 |
| 600 | 6.196 | 6.388 | +.192 | 2.729 | 2.819 | +.096 |
| 700 | 7.837 | 7.889 | +.052 | 3.364 | 3.298 | −.060 |
| 800 | 9.643 | 9.499 | −.144 | 4.040 | 3.785 | −.255 |
| 900 | 11.624 | 11.214 | −.410 | 4.751 | 4.270 | −.481 |
| 1,000 | 13.779 | 13.029 | −.750 | 5.509 | 4.761 | −.748 |

It will be noted that the differences in E.M.F. are reasonably close over the range 0° C. to 800° C., are good in the range of 600° C. to 800° C. and are particularly good near 700° C. (within .052 and .066 millivolt).

Having established the close match between the lead wires and their respective thermocouple leg wires as shown in Table I, the leg wires and lead wires were connected together, e.g., by welding, to form two separate thermocouples (one base metal and one noble metal), and the E.M.F. of each one was determined over the range 0–1000° C. The results of these tests are shown in Table II.

TABLE II.—E.M.F. IN MILLIVOLTS
(Reference Junction at 0° C.)

| Temp., °C. | (1) Pt-3% Rh vs. Pt-40% Rh | (2) Ni-4.54% W vs. 34% Ni, 20% Cr, 0.15% C-balance Fe | (3) Difference (1)−(2) |
|---|---|---|---|
| 0 | 0 | 0 | 0 |
| 100 | .239 | .031 | +.208 |
| 200 | .642 | .524 | +.118 |
| 300 | 1.187 | 1.209 | −.022 |
| 400 | 1.865 | 1.847 | +.018 |
| 500 | 2.656 | 2.598 | +.058 |
| 600 | 3.569 | 3.471 | +.098 |
| 700 | 4.591 | 4.478 | +.113 |
| 800 | 5.714 | 5.607 | +.107 |
| 900 | 6.944 | 6.878 | +.066 |
| 1,000 | 8.268 | 8.282 | −.014 |

It will be seen from Table II that the E.M.F. vs. temperature relationship for the prototype lead wires and Pt-3% Rh vs. Pt-40% Rh thermocouple is very good throughout the range of 0° C. to 1000° C.

To further evaluate the lead wires of the invention another test was made under identical conditions except that the negative lead wire given in Tables I and II (Ni-4.54% W) was substituted by a negative lead wire composed of Ni-4.45% W. The results are tabulated in the following Table III:

TABLE III.—E.M.F. IN MILLIVOLTS
(Reference Junction at 0° C.)

| Temp., °C. | (1) Positive Lead- 34% Ni, 20% Cr, 0.15% C- balance Fe vs. Pt-27 | (2) Negative Lead- Ni-4.45% W vs. Pt-27 | (3) Ni-4.45% W vs. 34% Ni 20% Cr 0.15% C- balance Fe | (4) Pt-3% Rh vs. Pt-40% Rh | (5) Difference (4)-(3) |
|---|---|---|---|---|---|
| 0 | 0 | 0 | 0 | 0 | 0 |
| 100 | .524 | .471 | .053 | .239 | +.186 |
| 200 | 1.293 | .722 | .571 | .642 | +.071 |
| 300 | 2.271 | 1.024 | 1.247 | 1.187 | −.060 |
| 400 | 3.418 | 1.532 | 1.786 | 1.865 | +.079 |
| 500 | 4.728 | 2.092 | 2.636 | 2.656 | +.020 |
| 600 | 6.196 | 2.691 | 3.505 | 3.569 | +.064 |
| 700 | 7.837 | 3.323 | 4.514 | 4.591 | +.077 |
| 800 | 9.643 | 3.985 | 5.658 | 5.714 | +.056 |
| 900 | 11.624 | 4.698 | 6.926 | 6.944 | +.018 |
| 1,000 | 13.779 | 5.459 | 8.320 | 8.268 | −.052 |

In Table III, it will be noted that the match of the lead wires of the invention to the thermocouple is extremely close throughout the entire range of 0° C. to 1000° C.

The low E.M.F. response in the range of 0–100° C. of the base metal lead wire couple is shown in FIGURE 2 by the shallow slope of the lead wire curve in this temperature range. The advantages of this response were indicated above.

Qualitative oxidation tests were run to determine the stability of the base metal lead wires in air. The wires were exposed to stagnant air for 24 hours at temperatures ranging from 750° to 1000° C. and then tests to determine the E.M.F. vs. temperature relationship were run. Results of the tests are tabulated in Table IV. The data show that such lead wires were stable in oxidizing atmospheres to about 850–900° C. These tests were relatively severe with respect to ultimate use of the lead wires, usually enclosed in a protective sheath and packed with insulation.

TABLE IV—E.M.F. IN MILLIVOLTS
(Reference function at 0° C.)

| Temp., ° C. | Negative Control | Lead Wire-Ni-4.45% W vs. Pt-27 | | | | | |
|---|---|---|---|---|---|---|---|
| | | 750° C. | 800° C. | 850° C. | 900° C. | 950° C. | 1,000° C. |
| 100 | .471 | .478 | .478 | .484 | .477 | .445 | .243 |
| 200 | .722 | .734 | .737 | .744 | .723 | .677 | .334 |
| 300 | 1.024 | 1.038 | 1.043 | 1.051 | 1.019 | .959 | .481 |
| 400 | 1.532 | 1.550 | 1.555 | 1.561 | 1.517 | 1.446 | .880 |
| 500 | 2.092 | 2.113 | 2.117 | 2.120 | 2.066 | 1.990 | 1.355 |
| 600 | 2.691 | 2.711 | 2.715 | 2.716 | 2.647 | 2.561 | 1.812 |
| 700 | 3.323 | 3.340 | 3.345 | 3.345 | 3.262 | 3.163 | 2.310 |
| 800 | 3.985 | 4.009 | 4.014 | 4.011 | 3.915 | 3.800 | 2.834 |
| 900 | 4.698 | 4.719 | 4.724 | 4.719 | 4.613 | 4.478 | 3.338 |
| 1,000 | 5.459 | 5.483 | 5.488 | 5.478 | 5.354 | 5.202 | 3.985 |

| Temp., ° C. | Positive Control | Lead Wire-34% Ni, 20% Cr, 0.15% C, balance Fe vs Pt-27 | | | | | |
|---|---|---|---|---|---|---|---|
| | | 750° C. | 800° C. | 850° C. | 900° C. | 950° C. | 1,000° C. |
| 100 | .524 | .521 | .522 | .531 | .525 | .525 | .525 |
| 200 | 1.293 | 1.301 | 1.302 | 1.301 | 1.301 | 1.301 | 1.302 |
| 300 | 2.271 | 2.285 | 2.288 | 2.285 | 2.281 | 2.282 | 2.282 |
| 400 | 3.418 | 3.447 | 3.451 | 3.448 | 3.446 | 3.447 | 3.445 |
| 500 | 4.728 | 4.771 | 4.777 | 4.772 | 4.757 | 4.759 | 4.756 |
| 600 | 6.196 | 6.249 | 6.256 | 6.250 | 6.234 | 6.235 | 6.231 |
| 700 | 7.837 | 7.900 | 7.908 | 7.901 | 7.875 | 7.876 | 7.872 |
| 800 | 9.643 | 9.713 | 9.723 | 9.714 | 9.688 | 9.689 | 9.687 |
| 900 | 11.624 | 11.697 | 11.708 | 11.699 | 11.668 | 11.670 | 11.670 |
| 1,000 | 13.779 | 13.851 | 13.863 | 13.854 | 13.827 | 13.289 | 13.832 |

NOTE.—Control Samples, annealed 850° C., 15 minutes, air. Test Samples, annealed at indicated temperatures for 24 hours in stagnant air.

Various modifications of the invention are contemplated within the scope of the appended claims.

We claim:
1. A thermocouple having a leg and lead wire combination comprising a first leg wire of 39% to 41% rhodium and the balance being platinum joined to a second leg wire of 2.5% to 3.5% rhodium, 0–2% of a metal selected from the group consisting of zirconium, titanium, gold, cerium, thorium and oxides thereof, and the balance being platinum, a lead wire connected to the first leg composed of 33.5–34.5% nickel, 19.5–20.5% chromium, up to 0.15% carbon and the balance being iron, and a lead wire connected to the second leg composed of 4.25–4.75% tungsten and the balance being nickel.

2. A thermocouple leg and lead wire combination according to claim 1, in which the first leg is composed of platinum and 40% rhodium.

3. A thermocouple leg and lead wire combination according to claim 1, in which the second leg is composed of platinum and 3% rhodium.

4. A thermocouple leg and lead wire combination according to claim 1, in which the lead wire connected to the first leg is composed of 34% nickel, 20% chromium, 0.15% carbon, balance iron.

5. A thermocouple leg and lead wire combination according to claim 1, in which the lead wire connected to the second leg is composed of nickel and 4.54% tungsten.

6. A thermocouple leg and lead wire combination according to claim 1, in which the lead wire connected to the second leg is composed of nickel and 4.45% tungsten.

References Cited

UNITED STATES PATENTS

| 764,174 | 7/1904 | Bristol | 136—236 |
| 779,090 | 1/1905 | Marsh | 136—236 |
| 781,290 | 1/1905 | Marsh | 136—241 |
| 839,984 | 1/1907 | Bristol | 136—227 |
| 2,137,057 | 11/1938 | Mason | 136—236 |
| 2,677,005 | 4/1954 | Land et al. | 136—236 |

WINSTON A. DOUGLAS *Primary Examiner.*

A. BEKELMAN, *Assistant Examiner.*

U.S. Cl. X.R.

136—236, 238, 239, 241